United States Patent
Zhang et al.

(10) Patent No.: US 11,696,325 B2
(45) Date of Patent: Jul. 4, 2023

(54) CONTROL SIGNALING TRANSMISSION METHOD AND DEVICE

(71) Applicant: HUAWEI TECHNOLOGIES CO., LTD., Guangdong (CN)

(72) Inventors: Xingwei Zhang, Beijing (CN); Chao Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 61 days.

(21) Appl. No.: 16/054,120

(22) Filed: Aug. 3, 2018

(65) Prior Publication Data

US 2018/0343675 A1    Nov. 29, 2018

Related U.S. Application Data

(63) Continuation of application No. PCT/CN2016/073706, filed on Feb. 5, 2016.

(51) Int. Cl.
*H04W 74/08* (2009.01)
*H04L 5/00* (2006.01)
(Continued)

(52) U.S. Cl.
CPC ........... *H04W 74/08* (2013.01); *H04L 1/0038* (2013.01); *H04L 5/0033* (2013.01); *H04L 5/0053* (2013.01); *H04L 5/0064* (2013.01); *H04L 5/0094* (2013.01); *H04W 72/0446* (2013.01); *H04W 72/563* (2023.01); *H04L 5/0044* (2013.01); *H04L 5/0048* (2013.01); *Y02D 30/70* (2020.08)

(58) Field of Classification Search
None
See application file for complete search history.

(56) References Cited

U.S. PATENT DOCUMENTS

2009/0088148 A1    4/2009    Chung et al.
2010/0254268 A1    10/2010   Kim et al.
(Continued)

FOREIGN PATENT DOCUMENTS

CN    101809898 A    8/2010
CN    101883369 A    11/2010
(Continued)

OTHER PUBLICATIONS

Linkage between SA and data resource of D2D communication, 3GPP TSG RAN WG1, R1-142901, Aug. 18-22, 2014 (Year: 2014).*

(Continued)

*Primary Examiner* — Yemane Mesfin
*Assistant Examiner* — Jeff Banthrongsack
(74) *Attorney, Agent, or Firm* — Fish & Richardson P.C.

(57) ABSTRACT

The present disclosure includes systems, devices, and methods that provide a control signaling transmission method. One example method includes: determining a resource subset used to transmit control signaling, where the resource subset is a part of a resource pool used to transmit the control signaling; and performing one of the following operations: determining a transmission location of the control signaling in the resource subset and sending the control signaling at the transmission location, or performing blind control signaling detection in the resource subset.

14 Claims, 6 Drawing Sheets

S501 — A transmit-end device determines a resource subset used to transmit control signaling S502 — The transmit-end device determines a transmission location of the control signaling in the resource subset and sends the control signaling at the transmission location S503 — A receive-end device determines the resource subset used to transmit the control signaling, and performs blind control signaling detection in the resource subset

(51) Int. Cl.
   *H04W 72/04*    (2023.01)
   *H04L 1/00*     (2006.01)
   *H04W 72/563*   (2023.01)
   *H04W 72/0446*  (2023.01)

(56) References Cited

U.S. PATENT DOCUMENTS

| | | | |
|---|---|---|---|
| 2012/0182977 A1* | 7/2012 | Hooli | H04W 72/1278 370/336 |
| 2012/0294252 A1* | 11/2012 | Kwon | H04L 5/0053 370/329 |
| 2014/0086188 A1 | 3/2014 | Hoymann et al. | |
| 2014/0119317 A1 | 5/2014 | Kim et al. | |
| 2014/0185530 A1* | 7/2014 | Kuchibhotla | H04W 4/90 370/329 |
| 2016/0157254 A1* | 6/2016 | Novlan | H04W 72/02 370/329 |
| 2016/0286570 A1 | 9/2016 | Chae et al. | |
| 2017/0041829 A1 | 2/2017 | Dai et al. | |
| 2017/0188321 A1 | 6/2017 | Matsumoto et al. | |

FOREIGN PATENT DOCUMENTS

| | | |
|---|---|---|
| CN | 103002581 A | 3/2013 |
| CN | 103621003 A | 3/2014 |
| CN | 103636151 A | 3/2014 |
| CN | 105307220 A | 2/2016 |
| JP | 2016019114 A | 2/2016 |
| WO | 2015021185 A1 | 2/2015 |
| WO | 2015065014 A1 | 5/2015 |
| WO | 2015137720 A1 | 9/2015 |
| WO | 2015158056 A1 | 10/2015 |
| WO | 2015170763 A1 | 11/2015 |
| WO | 2015171048 A1 | 11/2015 |
| WO | 2015200607 A1 | 12/2015 |

OTHER PUBLICATIONS

Linkage between SA and data resource of D2D communication, 3GPP TSG RAN WG1 (Aug. 18-22, 2014)—R1-142901 (Year: 2014).*

Half Duplex impacts mitigation for V2X, 3GPP TSG RAN WG1 (Oct. 5-9, 2015)—R1-155520 (Year: 2015).*

Catt: "Linkage between SA and data resource of D2D communication", 3GPP Draft; R1-142901, vol. RAN WG1, No. Dresden, Germany; Aug. 17, 2014; XP050788385, 4 pages.

Interdigital: "On control signaling and scheduling assignments for D2D", 3GPP Draft; R1-142350, vol. RAN WG1, no. Seoul, Korea; May 18, 2014, XP050789467, 4 pages.

Nokia Corporation et al: "Discussions on PSBCH", 3GPP Draft; R1-144164, Oct. 5, 2014, XP050875445, 6 pages.

Samsung: "Half Duplex impacts mitigation for V2X", 3GPP Draft; R1-155520, Oct. 4, 2015, XP051039673, 4 pages.

Nokia Networks et al: "Scheduling Assignment design for D2D communications", 3GPP Draft; R1-144166, Sep. 27, 2014, XP050869810, 6 pages.

LG Electronics:"D2D Grant in Mode 1 Communication", 3GPP Draft; R1-143182, Aug. 17, 2014, XP050788659, 8 pages.

Communication Pursuant to Rule 164(1) EPC issued in European Application No. 16888837.8 dated Dec. 18, 2018, 19 pages.

Extended European Search Report issued in European Application No. 16888837.8 dated Mar. 19, 2019, 28 pages.

Office Action issued in Japanese Application No. 2018-540777 dated May 21, 2019, 9 pages (with English translation).

Huawei, HiSilicon, NB-PDCCH search space. 3GPP TSG RAN WG1 NB-IoT Ad-Hoc Meeting Budapest, Hungary, Jan. 18-20, 2016, R1-160029, 3 pages.

3GPP TS 36 213 V13.0.1 (Jan. 2016), 3rd Generation Partnership Project; Technical Specification Group Radio Access Network; Evolved Universal Terrestrial Radio Access (E-UTRA); Physical layer procedures(Release 13).326 pages.

3GPP TS 36.212 V13.0.0 (Dec. 2015), 3rd Generation Partnership Project;Technical Specification Group Radio Access Network; Evolved Universal Terrestrial Radio Access (E-UTRA); Multiplexing and channel coding(Release 13), 121 pages.

3GPP TS 36.331 V13.0.0 (Dec. 2015), 3rd Generation Partnership Project;Technical Specification Group Radio Access Network;Evolved Universal Terrestrial Radio Access (E-UTRA); Radio Resource Control (RRC);Protocol specification (Release 13), 507 pages.

International Search issued in International Application No. PCT/CN2016/073706 dated Oct. 31, 2016, 22 pages.

Office Action issued in Korean Application No. 2018-7024319 dated Sep. 4, 2019, 6 pages (with English translation.

Office Action issued in Japanese Application No. 2018-540777 dated Sep. 10, 2019, 8 pages (with English translation).

R1-141592—Huawei, HiSilicon, "Control information for D2D communication," 3GPP TSG RAN WG1 Meeting #76bis, Shenzhen, China, Mar. 31-Apr. 4, 2014, 4 pages.

Office Action issued in Japanese Application No. 2020-002939 dated Dec. 1, 2020, 10 pages (with English translation).

Office Action issued in Chinese Application No. 201680079893.0 dated Jul. 21, 2020, 4 pages.

* cited by examiner

CONTROL SIGNALING TRANSMISSION METHOD AND DEVICE

CROSS-REFERENCE TO RELATED APPLICATIONS

This application is a continuation of International Application No. PCT/CN2016/073706, filed on Feb. 5, 2016, the disclosure of which is hereby incorporated by reference in its entirety.

TECHNICAL FIELD

The present invention relates to the communications field, and in particular, to a control signaling transmission method and device.

BACKGROUND

With rapid development of wireless communications and emergence of very-high-speed services (for example, a high-definition video), load of a wireless communications network is increasing, and end-to-end communication emerges accordingly. In end-to-end communication, terminals may directly communicate with each other without forwarding performed by a base station, thereby reducing data load of the base station. End-to-end communication includes device-to-device (D2D) communication, vehicle-to-everything (V2X) communication, machine to machine (M2M) communication, or other communication.

In end-to-end device communication, a transmit-end device sends control signaling (for example, a scheduling assignment (SA), carried on a physical sidelink control channel (PSCCH)) and data (carried on a physical sidelink shared channel (PSSCH)) to a receive-end device; and the receive-end first performs blind control signaling detection, and if the control signaling is correctly received and a destination identifier (ID) included in the control signaling matches at least one ID in an ID list of the receive-end device, receives the data based on data-related information carried in the control signaling, to implement end-to-end communication.

There are two manners of allocating a resource that is used to transmit control signaling and data in end-to-end device communication. One manner is a centralized control method in which a central control device allocates a resource from a resource pool (preset contiguous resource blocks) to a transmit-end device in a scheduling manner. The other manner is a contention-based manner in which a transmit-end device obtains a resource from a resource pool (contiguous resource blocks allocated by the base station or a predefined system bandwidth) in a contention-based manner.

At present, a receive-end device performs blind control signaling detection at all locations in a resource pool, and blind detection is performed many times. Consequently, in end-to-end communication, the receive-end device has heavy demodulation/decoding workloads, a relatively large quantity of blind detection/blind decoding times, relatively large power consumption, and relatively high implementation complexity.

SUMMARY

Embodiments of the present invention provide a control signaling transmission method and device, so as to reduce demodulation/decoding workloads, a quantity of detection/blind decoding times, power consumption, and implementation complexity that are of a receive-end device in end-to-end communication.

To achieve the foregoing objective, the following technical solutions are used in the embodiments of the present invention.

According to a first aspect, a control signaling transmission method is provided, where the method is applied to an end-to-end communications device and includes:

determining a resource subset used to transmit control signaling, where the resource subset belongs to a resource pool used to transmit the control signaling; and determining a transmission location of the control signaling in the resource subset and sending the control signaling at the transmission location; or performing blind control signaling detection in the resource subset.

The end-to-end communications device may be a transmit-end device or a receive-end device in end-to-end communication. The device is referred to as an end-to-end communications device in this specification, and may alternatively have another name.

Optionally, end-to-end communication may include D2D communication, V2X communication, M2M, or another communication mode in which a base station does not need to perform forwarding. A specific form of end-to-end communication is not limited in the present invention.

Optionally, the resource pool is an entire resource interval that may be used to transmit the control signaling under scheduling by a base station, the resource pool is an entire resource interval, based on division by a base station, that may be used to transmit the control signaling, or the resource pool is a preset entire resource interval that may be used to transmit the control signaling.

In this way, the transmit-end device selects, in the determined resource subset, a location for transmitting the control signaling, and sends the control signaling at the location to the peer end, thereby controlling the sending location of the control signaling to be within the resource subset; and the receive-end device performs blind control signaling detection in the determined resource subset. The transmit-end device and the receive-end device cooperate with each other, so that the control signaling is transmitted (sent, or received through blind detection) within the resource subset. Compared with the prior art in which blind control signaling detection is performed in an entire resource pool, the first aspect greatly reduces workloads, increases a probability of correctness of detection, and reduces implementation complexity.

With reference to the first aspect, in a first possible implementation of the first aspect, the determining a resource subset used to transmit control signaling includes:

determining the resource subset based on a preset rule.

The preset rule is a predefined resource subset.

With reference to the first possible implementation of the first aspect, in a second possible implementation of the first aspect, the preset rule includes that the resource subset is a specified resource set.

In the second possible implementation of the first aspect, the resource set used to transmit the control signaling is predefined as the resource subset.

With reference to the first aspect, in a third possible implementation of the first aspect, the determining a resource subset used to transmit control signaling includes:

determining the resource subset based on a preset parameter, where the preset parameter is at least one of the following parameters: a control signaling-related parameter, a data-related parameter, a transmit-end-related parameter, a receive-end-related parameter, and a resource-related parameter.

In the third possible implementation of the first aspect, in a method for determining a resource subset, the resource subset can be determined provided that the preset parameter is determined.

It should be noted that, the preset parameter may be obtained through interaction with a base station in a handshake procedure, or the preset parameter may be preset. A manner of obtaining a preset parameter is not specifically limited in the present invention.

With reference to the third possible implementation of the first aspect, in a fourth possible implementation of the first aspect, the determining the resource subset based on a preset parameter includes:

if the preset parameter is one parameter, determining that the resource subset is a resource or a resource pattern number, in a first preset correspondence, corresponding to the preset parameter, where the first preset correspondence includes at least one preset parameter and a resource or a resource pattern number in a one-to-one correspondence with the at least one preset parameter; or if the preset parameter is a plurality of parameters, determining that the resource subset is an intersection set of resources or resource pattern numbers, in the first preset correspondence, corresponding to all parameters of the preset parameter.

Specifically, the fourth possible implementation of the first aspect is a specific implementation means of the third possible implementation of the first aspect. By presetting the first preset correspondence, the resource or the resource pattern number corresponding to the preset parameter may be obtained from the first preset correspondence provided that the preset parameter is obtained, and the resource or the resource pattern number is used as the resource subset.

With reference to the third possible implementation of the first aspect, in a fifth possible implementation of the first aspect, the determining the resource subset based on a preset parameter includes:

if the preset parameter is one parameter, determining that the resource subset is a resource or a resource pattern number, in a second preset correspondence, corresponding to a preset condition that the preset parameter satisfies, where the second preset correspondence includes at least one preset condition and a resource or a resource pattern number in a one-to-one correspondence with the at least one preset condition; or if the preset parameter is a plurality of parameters, determining that the resource subset is an intersection set of resources or resource pattern numbers, in the second preset correspondence, corresponding to a preset condition that each of the plurality of parameters satisfies.

Specifically, the fifth possible implementation of the first aspect is a specific implementation means of the third possible implementation of the first aspect. By presetting the second preset correspondence, whether the preset parameter satisfies a preset condition may be determined in the second preset correspondence provided that the preset parameter is obtained, and when the preset condition is satisfied, the resource or the resource pattern number corresponding to the satisfied preset condition may be obtained and used as the resource subset.

With reference to any one of the first aspect or the first possible implementation of the first aspect to the fifth possible implementation of the first aspect, in a sixth possible implementation of the first aspect, the end-to-end communications device is a receive-end device, and the control signaling, a radio network temporary identifier (RNTI) used for the control signaling, or a scrambling code used for the control signaling includes data type indication information; and after the control signaling is correctly received, the method further includes:

receiving data on a resource corresponding to the data type indication information.

Specifically, in end-to-end communication, in addition to sending the control signaling to the peer end, the transmit-end device sends the data to the peer end. The sixth possible implementation of the first aspect provides an implementation of data receiving when the end-to-end communications device is a receive-end device.

With reference to any one of the first aspect or the first possible implementation of the first aspect to the fifth possible implementation of the first aspect, in a seventh possible implementation of the first aspect, the control signaling and data are in a same subframe; and the control signaling includes L, or the control signaling includes S0 and/or L, where S0 is an interval between a resource end location of the control signaling and a resource start location of the data, and L is a length of the data.

Specifically, in the seventh possible implementation of the first aspect, if the control signaling and the data share a resource in a frequency division multiplexing manner in a same subframe, S0 is an interval between a resource end location of the control signaling in frequency domain and a resource start location of the data in frequency domain, where L is a length of the data in frequency domain.

Specifically, in the seventh possible implementation of the first aspect, if the control signaling and the data share a resource in a time division multiplexing manner in a same subframe, S0 is an interval between a resource end location of the control signaling in time domain and a resource start location of the data in time domain, where L is a length of the data in time domain.

Further, in the seventh possible implementation of the first aspect, when the control signaling and the data are in a same subframe and are continuous, the control signaling may include only L.

Further, in the seventh possible implementation of the first aspect, when the control signaling and the data are in a same subframe and L is a fixed value, the control signaling may include only S0.

With reference to the seventh possible implementation of the first aspect, in an eighth possible implementation of the first aspect, the end-to-end communications device is a receive-end device; and after the control signaling is correctly received, the method further includes:

if the control signaling includes S0 and L, receiving the data within a resource interval between S1+S0 and S1+S0+L, where S1 is the resource end location of the control signaling;

if the control signaling includes L, receiving the data within a resource interval between S1+1 and S1+1+L; or if the control signaling includes S0, receiving the data within a resource interval between S1+S0 and S1+S0+L, where L is a fixed value.

Based on the seventh possible implementation of the first aspect, the eighth possible implementation of the first aspect provides an implementation of data receiving when the end-to-end communications device is a receive-end device.

With reference to the eighth possible implementation of the first aspect, in a ninth possible implementation of the first aspect, the resource interval between S1+S0 and S1+S0+L or the resource interval between S1+1 and S1+1+L is located in one resource pool;

the resource interval between S1+S0 and S1+S0+L or the resource interval between S1+1 and S1+1+L is located at two ends of a resource pool; or the resource interval between S1+S0 and S1+S0+L or the resource interval between S1+1 and S1+1+L is located in two resource pools.

Specifically, in a ninth possible implementation of the first aspect, a location of the resource interval between S1+S0 and S1+S0+L in the resource pool or a location of the resource interval between S1+1 and S1+1+L in the resource pool is determined by the resource start location occupied by the data and the data length.

Further, the location of the resource interval between S1+S0 and S1+S0+L in the resource pool or the location of the resource interval between S1+1 and S1+1+L in the resource pool determines a location for sending data by the transmit-end device and a location for receiving data by the receive-end device.

With reference to the first possible implementation of the first aspect, in a tenth possible implementation of the first aspect, the control signaling and data share a resource in a time division multiplexing manner; and the preset rule includes: the resource subset is N symbols, in a resource block (RB) pair used to transmit the data, adjacent to a symbol occupied by a reference signal, where N is greater than or equal to 1.

The RB pair used to transmit the data is determined by the transmit-end device based on a size of the to-be-transmitted data and based on a resource that may be used to transmit the data and that is in the predefined RB pair. The process is not elaborated in the present invention.

Optionally, the transmit-end device may be a base station in end-to-end communication, or the transmit-end device may be a sending terminal in end-to-end communication.

Further, when the transmit-end terminal is a base station, the base station sends the control signaling and the data to a receiving terminal by using a sending terminal.

With reference to the tenth possible implementation of the first aspect, in an eleventh possible implementation of the first aspect, the end-to-end communications device is a transmit-end device; and the sending the control signaling at the transmission location includes:

if N is greater than 1, dividing the control signaling into a first part to an $N^{th}$ part in descending order of field priorities; and transmitting, at the transmission location, the first part to the $N^{th}$ part in ascending order of distances between the parts and the symbol occupied by the reference signal.

With reference to the tenth possible implementation of the first aspect or the eleventh possible implementation of the first aspect, in a twelfth possible implementation of the first aspect, the data needs to occupy X RB pairs in frequency domain, the control signaling needs to occupy Y RB pairs in frequency domain, and Y is less than or equal to X.

A specific value of N is dependent on values of X and Y.

A specific value of X is dependent on a size of the to-be-transmitted data and a size of a resource, in one RB pair, used to transmit the data.

A specific value of Y is dependent on a size of the control signaling and a size of a resource, in one RB pair, used to transmit the control signaling.

Further, the size of the resource, in one RB pair, used to transmit the data and the size of the resource, in one RB pair, used to transmit the control signaling may be preconfigured in a protocol and are known by parties in communication.

With reference to the twelfth possible implementation of the first aspect, in a thirteenth possible implementation of the first aspect, the end-to-end communications device is a transmit-end device, and the control signaling and the data are in a same subframe; and after the determining a transmission location of the control signaling in the resource subset and sending the control signaling at the transmission location, the method further includes:

if Y is equal to X, sending the data on a resource element RE (RE) other than a RE occupied by the reference signal and by the control signaling in the RB pair occupied by the control signaling; or if Y is less than X, sending a part of the data on a RE other than a RE occupied by the reference signal and by the control signaling in the RB pair occupied by the control signaling, and sending a remaining part of the data by using a remaining RB pair.

Optionally, the remaining RB pair and the RB pair occupied by the control signaling may be continuous or may be discontinuous. This is not specifically limited in the present invention.

With reference to any one of the tenth possible implementation of the first aspect to the thirteenth possible implementation of the first aspect, in a fourteenth possible implementation of the first aspect, the end-to-end communications device is a receive-end device, and the control signaling includes a length L of the data; and after the control signaling is correctly received, the method further includes:

if a transmission resource of the data is preset to be at a frequency higher than that of a transmission resource of the control signaling, receiving, at a resource start location or end location of the control signaling, the data whose length is L by using the higher frequency; or if a transmission resource of the data is preset to be at a frequency lower than that of a transmission resource of the control signaling, receiving, at a resource start location or end location of the control signaling, the data whose length is L by using the lower frequency.

A relationship between relative locations of the transmission resources of the data and the control signaling may be predefined. To be specific, the transmission resource of the data is predefined to be at a frequency higher than that or a frequency lower than that of the transmission resource of the control signaling. Predefined content is not specifically limited in the present invention.

With reference to any one of the tenth possible implementation of the first aspect to the thirteenth possible implementation of the first aspect, in a fifteenth possible implementation of the first aspect, the end-to-end communications device is a receive-end device, and the control signaling includes a length L of the data and direction indication information; and after the control signaling is correctly received, the method further includes:

if the direction indication information indicates a high-frequency direction, receiving, at a resource start location or end location of the control signaling, the data whose length is L by using a high frequency; or if the direction indication information indicates a low-frequency direction, receiving, at a resource start location or end location of the control signaling, the data whose length is L by using a low frequency.

Specifically, in the fourteenth possible implementation of the first aspect or the fifteenth possible implementation of the first aspect, whether the data is received based on the resource start location of the control signaling or the resource end location of the control signaling is dependent on a frequency direction of a resource corresponding to a resource number. This is not specifically limited in the present invention.

With reference to any one of the tenth possible implementation of the first aspect to the fifteenth possible implementation of the first aspect, in a sixteenth possible implementation of the first aspect, the control signaling includes a reference signal identifier in the remaining RB pair.

Further, when the transmit-end device sends the data, if the data is sent by using the remaining RB pair, the reference signal identifier in the remaining RB pair needs to be added to the control signaling and is used to instruct the receive-end device to receive the data from the remaining RB pair based on the reference signal identifier in the remaining RB pair.

With reference to any one of the tenth possible implementation of the first aspect to the fifteenth possible implementation of the first aspect, in a seventeenth possible implementation of the first aspect, the end-to-end communications device is a receive-end device, and the control signaling includes a reference signal identifier in the remaining RB pair; and after the control signaling is correctly received, the method further includes:

receiving the part of the data on the RE other than the RE occupied by the reference signal and by the control signaling in the RB pair occupied by the control signaling; and receiving the remaining part of the data on a RE other than a RE occupied by the reference signal in an RB pair indicated by the reference signal identifier in the remaining RB pair.

With reference to any one of the first aspect or the first possible implementation of the first aspect to the seventeenth possible implementation of the first aspect, in an eighteenth possible implementation of the first aspect, the control signaling is a SA or a broadcast message.

Further, the control signaling may alternatively be a physical sidelink broadcast channel (PSBCH). A type of the control signaling is not limited in the present invention, and all control-type signaling sent by the transmit-end device to the peer end in end-to-end communication is the control signaling described in the present invention.

According to a second aspect, a control signaling transmission device is provided, where the device includes:

a determining unit, configured to determine a resource subset used to transmit control signaling, where the resource subset belongs to a resource pool used to transmit the control signaling; and a sending unit, configured to determine a transmission location of the control signaling in the resource subset determined by the determining unit and send the control signaling at the transmission location; or a detection unit, configured to perform blind control signaling detection in the resource subset determined by the determining unit.

With reference to the second aspect, in a first possible implementation of the second aspect, the determining unit is specifically configured to:

determine the resource subset based on a preset rule.

With reference to the first possible implementation of the second aspect, in a second possible implementation of the second aspect, the preset rule includes that the resource subset is a specified resource set.

With reference to the second aspect, in a third possible implementation of the second aspect, the determining unit is specifically configured to:

determine the resource subset based on a preset parameter, where the preset parameter is at least one of the following parameters: a control signaling-related parameter, a data-related parameter, a transmit-end-related parameter, a receive-end-related parameter, and a resource-related parameter.

With reference to the third possible implementation of the second aspect, in a fourth possible implementation of the second aspect, the determining unit is specifically configured to:

if the preset parameter is one parameter, determine that the resource subset is a resource or a resource pattern number, in a first preset correspondence, corresponding to the preset parameter, where the first preset correspondence includes at least one preset parameter and a resource or a resource pattern number in a one-to-one correspondence with the at least one preset parameter; or if the preset parameter is a plurality of parameters, determine that the resource subset is an intersection set of resources or resource pattern numbers, in the first preset correspondence, corresponding to all parameters of the preset parameter.

With reference to the third possible implementation of the second aspect, in a fifth possible implementation of the second aspect, the determining unit is specifically configured to:

if the preset parameter is one parameter, determine that the resource subset is a resource or a resource pattern number, in a second preset correspondence, corresponding to a preset condition that the preset parameter satisfies, where the second preset correspondence includes at least one preset condition and a resource or a resource pattern number in a one-to-one correspondence with the at least one preset condition; or if the preset parameter is a plurality of parameters, determine that the resource subset is an intersection set of resources or resource pattern numbers, in the second preset correspondence, corresponding to a preset condition that each of the plurality of parameters satisfies.

With reference to any one of the second aspect or the first possible implementation of the second aspect to the fifth possible implementation of the second aspect, in a sixth possible implementation of the second aspect, the device is a receive-end device, and the control signaling, an RNTI used for the control signaling, or a scrambling code used for the control signaling includes data type indication information; and the device further includes:

a receiving unit, configured to receive data on a resource corresponding to the data type indication information.

With reference to any one of the second aspect or the first possible implementation of the second aspect to the fifth possible implementation of the second aspect, in a seventh possible implementation of the second aspect, the control signaling and data are in a same subframe; and the control signaling includes L, or the control signaling includes S0 and/or L, where S0 is an interval between a resource end location of the control signaling and a resource start location of the data, and L is a length of the data.

With reference to the seventh possible implementation of the second aspect, in an eighth possible implementation of the second aspect, the device is a receive-end device; and the device further includes a receiving unit, configured to:

if the control signaling includes S0 and L, receive the data within a resource interval between S1+S0 and S1+S0+L, where S1 is the resource end location of the control signaling;

if the control signaling includes L, receive the data within a resource interval between S1+1 and S1+1+L; or if the control signaling includes S0, receive the data within a resource interval between S1+S0 and S1+S0+L, where L is a fixed value.

With reference to the eighth possible implementation of the second aspect, in a ninth possible implementation of the second aspect, the resource interval between S1+S0 and S1+S0+L or the resource interval between S1+1 and S1+1+L is located in one resource pool;

the resource interval between S1+S0 and S1+S0+L or the resource interval between S1+1 and S1+1+L is located at two ends of a resource pool; or the resource interval between S1+S0 and S1+S0+L or the resource interval between S1+1 and S1+1+L is located in two resource pools.

With reference to the first possible implementation of the second aspect, in a tenth possible implementation of the second aspect, the control signaling and data share a resource in a time division multiplexing manner; and the preset rule includes: the resource subset is N symbols, in an RB pair used to transmit the data, adjacent to a symbol occupied by a reference signal, where N is greater than or equal to 1.

With reference to the tenth possible implementation of the second aspect, in an eleventh possible implementation of the second aspect, the device is a transmit-end device; and the sending unit is specifically configured to:

if N is greater than 1, divide the control signaling into a first part to an $N^{th}$ part in descending order of field priorities; and transmit, at the transmission location, the first part to the $N^{th}$ part in ascending order of distances between the parts and the symbol occupied by the reference signal.

With reference to the tenth possible implementation of the second aspect or the eleventh possible implementation of the second aspect, in a twelfth possible implementation of the second aspect, the data needs to occupy X RB pairs in frequency domain, the control signaling needs to occupy Y RB pairs in frequency domain, and Y is less than or equal to X.

With reference to the twelfth possible implementation of the second aspect, in a thirteenth possible implementation of the second aspect, the device is a transmit-end device, and the control signaling and the data are in a same subframe; and the sending unit is specifically configured to:

if Y is equal to X, send the data on a RE other than a RE occupied by the reference signal and by the control signaling in the RB pair occupied by the control signaling; or if Y is less than X, send a part of the data on a RE other than a RE occupied by the reference signal and by the control signaling in the RB pair occupied by the control signaling, and send a remaining part of the data by using a remaining RB pair.

With reference to any one of the tenth possible implementation of the second aspect to the thirteenth possible implementation of the second aspect, in a fourteenth possible implementation of the second aspect, the device is a receive-end device, and the control signaling includes a length L of the data; and the device further includes a receiving unit, configured to:

if a transmission resource of the data is preset to be at a frequency higher than that of a transmission resource of the control signaling, receive, at a resource start location or end location of the control signaling, the data whose length is L by using the higher frequency; or if a transmission resource of the data is preset to be at a frequency lower than that of a transmission resource of the control signaling, receive, at a resource start location or end location of the control signaling, the data whose length is L by using the lower frequency.

With reference to any one of the tenth possible implementation of the second aspect to the thirteenth possible implementation of the second aspect, in a fifteenth possible implementation of the second aspect, the device is a receive-end device, and the control signaling includes a length L of the data and direction indication information; and the device further includes a receiving unit, configured to:

if the direction indication information indicates a high-frequency direction, receive, at a resource start location or end location of the control signaling, the data whose length is L by using a high frequency; or if the direction indication information indicates a low-frequency direction, receive, at a resource start location or end location of the control signaling, the data whose length is L by using a low frequency.

With reference to any one of the tenth possible implementation of the second aspect to the fifteenth possible implementation of the second aspect, in a sixteenth possible implementation of the second aspect, the control signaling includes a reference signal identifier in the remaining RB pair.

With reference to any one of the tenth possible implementation of the second aspect to the fifteenth possible implementation of the second aspect, in a seventeenth possible implementation of the second aspect, the device is a receive-end device, and the control signaling includes a reference signal identifier in the remaining RB pair; and the sending unit is specifically configured to:

receive the part of the data on the RE other than the RE occupied by the reference signal and by the control signaling in the RB pair occupied by the control signaling; and receive the remaining part of the data on a RE other than a RE occupied by the reference signal in an RB pair indicated by the reference signal identifier in the remaining RB pair.

With reference to any one of the second aspect or the first possible implementation of the second aspect to the seventeenth possible implementation of the second aspect, in an eighteenth possible implementation of the second aspect, the control signaling is a SA or a broadcast message.

According to a third aspect, a control signaling transmission device is provided, where the device includes:

a processor, configured to determine a resource subset used to transmit control signaling, where the resource subset belongs to a resource pool used to transmit the control signaling; and a transmitter, configured to determine a transmission location of the control signaling in the resource subset determined by the processor and send the control signaling at the transmission location; or the processor is further configured to perform blind control signaling detection in the resource subset.

With reference to the third aspect, in a first possible implementation of the third aspect, the processor is specifically configured to:

determine the resource subset based on a preset rule.

With reference to the first possible implementation of the third aspect, in a second possible implementation of the third aspect, the preset rule includes that the resource subset is a specified resource set.

With reference to the third aspect, in a third possible implementation of the third aspect, the processor is specifically configured to:

determine the resource subset based on a preset parameter, where the preset parameter is at least one of the following parameters: a control signaling-related parameter, a data-related parameter, a transmit-end-related parameter, a receive-end-related parameter, and a resource-related parameter.

With reference to the third possible implementation of the third aspect, in a fourth possible implementation of the third aspect, the processor is specifically configured to:

if the preset parameter is one parameter, determine that the resource subset is a resource or a resource pattern number, in a first preset correspondence, corresponding to the preset parameter, where the first preset correspondence includes at least one preset parameter and a resource or a resource pattern number in a one-to-one correspondence with the at least one preset parameter; or if the preset parameter is a plurality of parameters, determine that the resource subset is an intersection set of resources or resource pattern numbers, in the first preset correspondence, corresponding to all parameters of the preset parameter.

With reference to the third possible implementation of the third aspect, in a fifth possible implementation of the third aspect, the processor is specifically configured to:

if the preset parameter is one parameter, determine that the resource subset is a resource or a resource pattern number, in a second preset correspondence, corresponding to a preset condition that the preset parameter satisfies, where the second preset correspondence includes at least one preset condition and a resource or a resource pattern number in a one-to-one correspondence with the at least one preset condition; or if the preset parameter is a plurality of parameters, determine that the resource subset is an intersection set of resources or resource pattern numbers, in the second preset correspondence, corresponding to a preset condition that each of the plurality of parameters satisfies.

With reference to any one of the third aspect or the first possible implementation of the third aspect to the fifth possible implementation of the third aspect, in a sixth possible implementation of the third aspect, the device is a receive-end device, and the control signaling, a radio network temporary identifier RNTI used for the control signaling, or a scrambling code used for the control signaling includes data type indication information; and the device further includes:

a receiver, configured to receive data on a resource corresponding to the data type indication information.

With reference to any one of the third aspect or the first possible implementation of the third aspect to the fifth possible implementation of the third aspect, in a seventh possible implementation of the third aspect, the control signaling and data are in a same subframe; and the control signaling includes L, or the control signaling includes S0 and/or L, where S0 is an interval between a resource end location of the control signaling and a resource start location of the data, and L is a length of the data.

With reference to the seventh possible implementation of the third aspect, in an eighth possible implementation of the third aspect, the device is a receive-end device; and the device further includes a receiver, configured to:

if the control signaling includes S0 and L, receive the data within a resource interval between S1+S0 and S1+S0+L, where S1 is the resource end location of the control signaling;

if the control signaling includes L, receive the data within a resource interval between S1+1 and S1+1+L; or if the control signaling includes S0, receive the data within a resource interval between S1+S0 and S1+S+L, where L is a fixed value.

With reference to the eighth possible implementation of the third aspect, in a ninth possible implementation of the third aspect, the resource interval between S1+S and S1+S0+L or the resource interval between S1+1 and S1+1+L is located in one resource pool;

the resource interval between S1+S0 and S1+S0+L or the resource interval between S1+1 and S1+1+L is located at two ends of a resource pool; or the resource interval between S1+S0 and S1+S0+L or the resource interval between S1+1 and S1+1+L is located in two resource pools.

With reference to the first possible implementation of the third aspect, in a tenth possible implementation of the third aspect, the control signaling and data share a resource in a time division multiplexing manner; and the preset rule includes: the resource subset is N symbols, in an RB pair used to transmit the data, adjacent to a symbol occupied by a reference signal, where N is greater than or equal to 1.

With reference to the tenth possible implementation of the third aspect, in an eleventh possible implementation of the third aspect, the device is a transmit-end device; and the transmitter is specifically configured to:

if N is greater than 1, divide the control signaling into a first part to an $N^{th}$ part in descending order of field priorities; and transmit, at the transmission location, the first part to the $N^{th}$ part in ascending order of distances between the parts and the symbol occupied by the reference signal.

With reference to the tenth possible implementation of the third aspect or the eleventh possible implementation of the third aspect, in a twelfth possible implementation of the third aspect, the data needs to occupy X RB pairs in frequency domain, the control signaling needs to occupy Y RB pairs in frequency domain, and Y is less than or equal to X.

With reference to the twelfth possible implementation of the third aspect, in a thirteenth possible implementation of the third aspect, the device is a transmit-end device, and the control signaling and the data are in a same subframe; and the transmitter is specifically configured to:

if Y is equal to X, send the data on a RE other than a RE occupied by the reference signal and by the control signaling in the RB pair occupied by the control signaling; or if Y is less than X, send a part of the data on a RE other than a RE occupied by the reference signal and by the control signaling in the RB pair occupied by the control signaling, and send a remaining part of the data by using a remaining RB pair.

With reference to any one of the tenth possible implementation of the third aspect to the thirteenth possible implementation of the third aspect, in a fourteenth possible implementation of the third aspect, the device is a receive-end device, and the control signaling includes a length L of the data; and the device further includes a receiver, configured to:

if a transmission resource of the data is preset to be at a frequency higher than that of a transmission resource of the control signaling, receive, at a resource start location or end location of the control signaling, the data whose length is L by using the higher frequency; or if a transmission resource of the data is preset to be at a frequency lower than that of a transmission resource of the control signaling, receive, at a resource start location or end location of the control signaling, the data whose length is L by using the lower frequency.

With reference to any one of the tenth possible implementation of the third aspect to the thirteenth possible implementation of the third aspect, in a fifteenth possible implementation of the third aspect, the device is a receive-end device, and the control signaling includes a length L of the data and direction indication information; and the device further includes a receiver, configured to:

if the direction indication information indicates a high-frequency direction, receive, at a resource start location or end location of the control signaling, the data whose length is L by using a high frequency; or if the direction indication information indicates a low-frequency direction, receive, at a resource start location or end location of the control signaling, the data whose length is L by using a low frequency.

With reference to any one of the tenth possible implementation of the third aspect to the fifteenth possible implementation of the third aspect, in a sixteenth possible implementation of the third aspect, the control signaling includes a reference signal identifier in the remaining RB pair.

With reference to any one of the tenth possible implementation of the third aspect to the fifteenth possible implementation of the third aspect, in a seventeenth possible implementation of the third aspect, the device is a receive-end device, and the control signaling includes a reference signal identifier in the remaining RB pair; and the transmitter is specifically configured to:

receive the part of the data on the RE other than the RE occupied by the reference signal and by the control signaling in the RB pair occupied by the control signaling; and receive the remaining part of the data on a RE other than a RE occupied by the reference signal in an RB pair indicated by the reference signal identifier in the remaining RB pair.

With reference to any one of the third aspect or the first possible implementation of the third aspect to the seventeenth possible implementation of the third aspect, in an eighteenth possible implementation of the third aspect, the control signaling is a SA or a broadcast message.

According to the control signaling transmission method and device that are provided in the embodiments of the present invention, the resource subset used to transmit the control signaling is determined, where the resource subset is a part of the resource pool used to transmit the control signaling; and the transmission location of the control signaling is determined in the resource subset and the control signaling is sent at the transmission location, or blind control signaling detection is performed in the resource subset. In this way, after determining the resource subset based on a common principle, the transmit-end device and the receive-end device limit the transmission location of the control signaling to be within the resource subset. The transmit end sends the control signaling only in the resource subset, and the receive-end device performs blind control signaling detection only in the resource subset. The transmit-end device and the receive-end device cooperate with each other, so that the control signaling is transmitted (sent, or received through blind detection) within the resource subset. Compared with the prior art in which blind control signaling detection is performed in an entire resource pool, the embodiments greatly reduce demodulation/decoding workloads and a quantity of detection/blind decoding times that are of the receive-end device, and reduce power consumption and implementation complexity that are of the receive-end device.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

Figure 1:
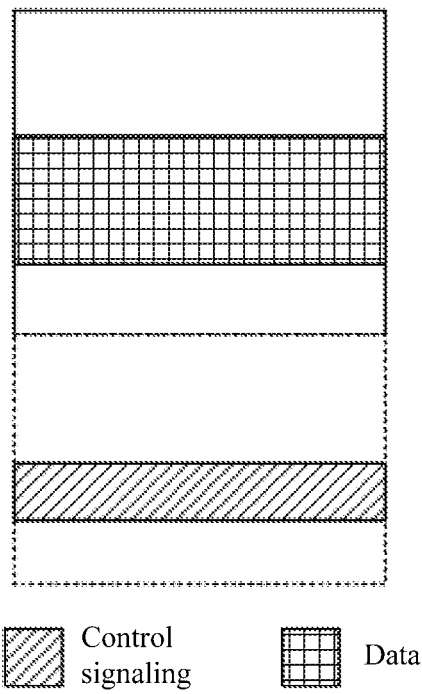
FIG. 1 is a schematic diagram of resource locations of control signaling and data in the prior art.

In an end-to-end communications device, to satisfy a latency requirement, a transmit end may send control signaling and data in one subframe at the same time. As shown in FIG. 1, a receive end performs blind control signaling detection within a resource interval (a dashed-line box in the figure) of a control signaling resource pool, and simultaneously needs to cache data that is in a same subframe, because data scheduled by using a SA may be in a same subframe. If the SA is correctly received and an ID in the SA matches an ID in the receive end, whether to demodulate/decode the cached data (in a same subframe) or receive subsequent data (in a different subframe) is determined based on data-related information carried in the SA.

Figure 2:
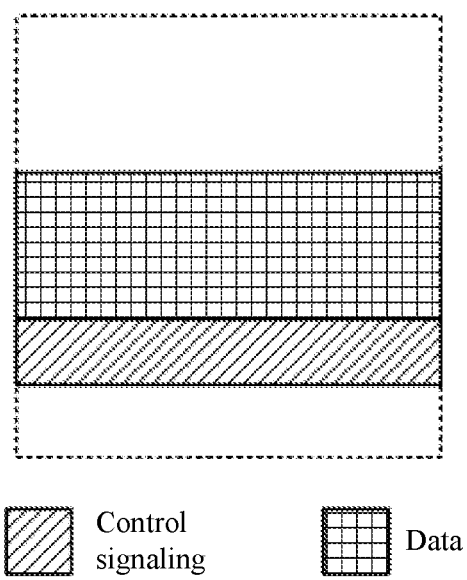
FIG. 2 is another schematic diagram of resource locations of control signaling and data in the prior art.

To reduce a peak to average power ratio (PAPR), for a terminal, it is optimal that resources occupied by the control signaling and the data are continuous. A currently used method is that the control signaling and the data share a resource pool, so that the data can be placed continuously, as shown in FIG. 2. However, a scope of the control signaling resource pool (a dashed-line box in FIG. 2) is enlarged. Compared with that in FIG. 1, a PAPR decreases, but control signaling may occupy more locations, and a scope of blind detection performed by the receive-end device increases. This further increases a probability of correctness of detection, a quantity of blind detection times, demodulation/decoding workloads, power consumption, and complexity that are of the receive-end device.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

A basic principle of the present invention is: A transmit-end device and a receive-end device determine, based on a common solution, a resource subset used to transmit control signaling, where the resource subset is a part of a resource pool; the transmit-end device determines, in the resource subset, a transmission location for transmitting the control signaling and sends the control signaling; and the receive-end device performs blind control signaling detection in the resource subset. This reduces a scope of available resources for transmitting the control signaling, reduces blind detection workloads of the receive-end device, increases a probability of correctness of blind detection, and reduces implementation complexity.

Figure 3:
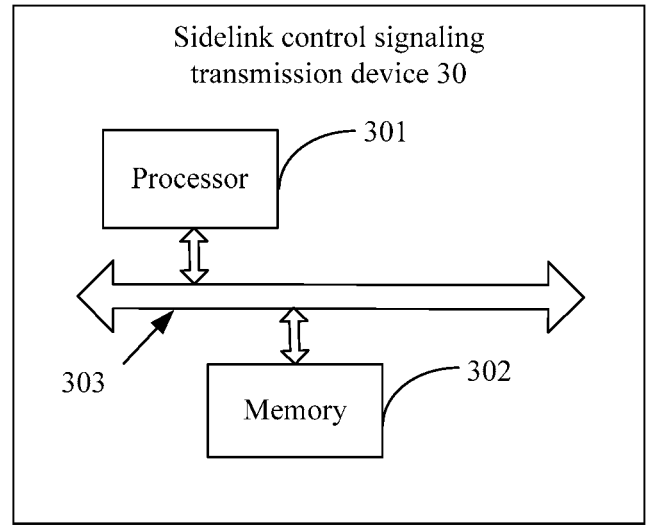
FIG. 3 is a schematic structural diagram of a control signaling transmission device according to an embodiment of the present invention.

A control signaling transmission method provided in the embodiments of the present invention may be performed by a control signaling transmission device provided in the embodiments of the present invention. The device may be a part or all of a base station, a part or all of a transmit-end device in end-to-end communication, or a part or all of a receive-end device in end-to-end communication. FIG. 3 is a schematic structural diagram of a control signaling transmission device related to the embodiments of the present invention.

As shown in FIG. 3, the control signaling transmission device 30 may include a processor 301, a memory 302, and a communications bus 303.

Figure 4:
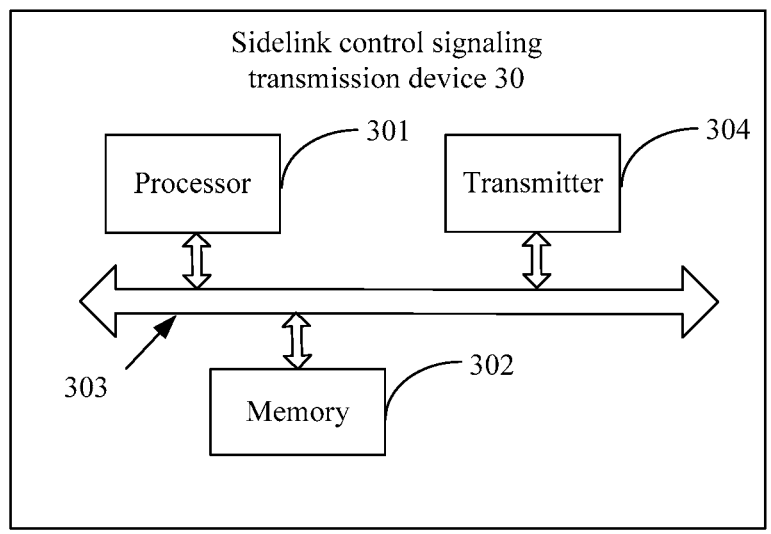
FIG. 4 is a schematic structural diagram of another control signaling transmission device according to an embodiment of the present invention.

Further, as shown in FIG. 4, when the control signaling transmission device 30 is a transmit-end device, the control signaling transmission device 30 further includes a transmitter 304.

The following details each constituent part of the control signaling transmission device 30 with reference to FIG. 3.

The memory 302 may be a volatile memory, such as a random-access memory (RAM), a non-volatile memory, such as a read-only memory (ROM), a flash memory, a hard disk drive (HDD), a solid-state drive (SSD), or a combination of the foregoing types of memories, and is configured to store a related application program and a configuration file that can be used to implement the method in the present invention.

The processor 301 is a control center of the control signaling transmission device 30, and may be a central processing unit (CPU), may be an application-specific integrated circuit (ASIC), or may be one or more integrated circuits configured to implement this embodiment of the present invention, for example, one or more microprocessors (DSP), or one or more field-programmable gate arrays (FPGA). The processor 301 may execute various functions of the control signaling transmission device 30 by running or executing a software program and/or a module that are/is stored in the memory 302 and invoking data stored in the memory 302.

The communications bus 303 may be an Industry Standard Architecture (ISA) bus, a Peripheral Component (PCI) bus, an Extended Industry Standard Architecture (EISA) bus, or the like. The bus 303 may be classified into an address bus, a data bus, a control bus, and the like. For ease of representation, the bus is represented by using only one bold line in FIG. 3 and FIG. 4, which, however, does not mean that there is only one bus or one type of bus.

The processor 301 is configured to determine a resource subset used to transmit control signaling, where the resource subset belongs to a resource pool used to transmit the control signaling.

The processor 301 is further configured to determine a transmission location of the control signaling in the resource subset and send the control signaling at the transmission location by using the transmitter 304; or perform blind control signaling detection in the resource subset.

Optionally, the processor 301 may be specifically configured to determine the resource subset based on a preset rule.

Optionally, the processor 301 may be specifically configured to determine the resource subset based on a preset parameter, where the preset parameter is at least one of the following parameters: a control signaling-related parameter, a data-related parameter, a transmit-end-related parameter, a receive-end-related parameter, and a resource-related parameter.

The following details the embodiments of the present invention with reference to the accompanying drawings.

Figure 5:
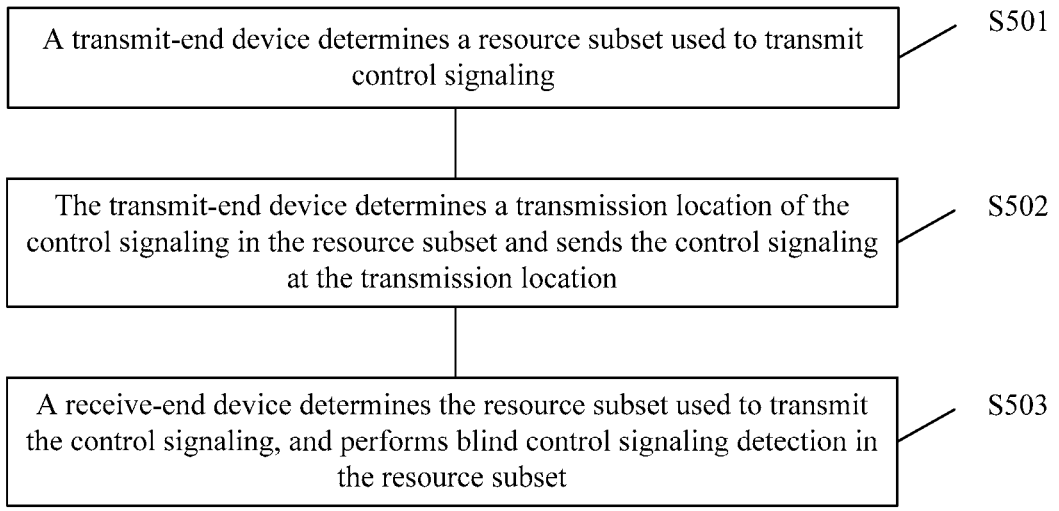
FIG. 5 is a schematic flowchart of a control signaling transmission method according to an embodiment of the present invention.

According to one aspect, an embodiment of the present invention provides a control signaling transmission method, applied to an end-to-end communications device, where the end-to-end communications device is a transmit-end device or a receive-end device. As shown in FIG. 5, the method may include the following steps.

S501. A transmit-end device determines a resource subset used to transmit control signaling.

The resource subset belongs to a resource pool used to transmit the control signaling.

Optionally, the resource subset is a part of the resource pool.

Optionally, in a centralized resource allocation mode, the resource pool is an entire resource interval that may be used to transmit the control signaling under scheduling by a base station; or in a contention-based resource allocation mode, the resource pool is an entire resource interval, based on division by a base station, that may be used to transmit the control signaling; or the resource pool is a preset entire resource interval that may be used to transmit the control signaling.

Further, if data and the control signaling share a resource pool, the resource pool includes a data resource pool and a control signaling resource pool.

Optionally, the control signaling may be a SA or a broadcast message.

Specifically, solutions used to determine the resource subset of the control signaling include but are not limited to the following two solutions (the following first solution and second solution).

First Solution:

determining the resource subset based on a preset rule.

In the foregoing first solution, specific content of the preset rule may include but is not limited to the following two cases.

A first case is: The preset rule includes that the resource subset is a specified resource set.

In other words, a scope of the resource subset is explicitly provided in the content of the preset rule.

For example, the preset rule may be defined: The resource subset is an odd-numbered RB identifier (index) or an odd-numbered resource element group (REG) index.

For example, the preset rule may be defined: The resource subset is an even-numbered RB index or an even-numbered REG index.

For example, the preset rule may be defined: The resource subset is a specific quantity of RBs or REGs in a high-frequency portion.

It should be noted that, the foregoing examples are merely used to describe the content of the preset rule in the first case, but are not intended to specifically limit the content of the preset rule. In actual application, the content of the preset rule may be predefined based on an actual requirement. This is not specifically limited in the present invention.

It should be noted that, the solution in the first case may be applied to a scenario in which the control signaling and the data are in a same subframe, or may be applied to a scenario in which the control signaling and the data are in different subframes.

Further, when the solution in the first case is applied to the scenario in which the control signaling and the data are in a same subframe, the solution may be applied to a frequency division multiplexing scenario for the control signaling and the data, or may be applied to a time division multiplexing scenario for the control signaling and the data.

A second case is: The control signaling and the data share a resource in a time division multiplexing manner.

The preset rule includes: The resource subset is N symbols, in an RB pair used to transmit the data, adjacent to a symbol occupied by a reference signal.

N is greater than or equal to 1.

Optionally, the reference signal may be a demodulation reference signal (DMRS), or the reference signal may be a sounding reference signal (SRS). Certainly, the reference signal may alternatively be another reference signal. A type of the reference signal is not specifically limited in this embodiment of the present invention.

Optionally, the N symbols may be on two sides of the symbol occupied by the reference signal and may be adjacent to the reference symbol, or may be on one side of the symbol occupied by the reference signal and may be adjacent to the reference symbol. This is not specifically limited in this embodiment of the present invention.

Specifically, the data needs to occupy X RB pairs in frequency domain, the control signaling needs to occupy Y RB pairs in frequency domain, and Y is less than or equal to X.

A specific value of N is dependent on values of X and Y.

A specific value of X is dependent on a size of the to-be-transmitted data and a size of a resource, in one RB pair, used to transmit the data.

A specific value of Y is dependent on a size of the control signaling and a size of a resource, in one RB pair, used to transmit the control signaling.

Further, the size of the resource, in one RB pair, used to transmit the data and the size of the resource, in one RB pair, used to transmit the control signaling may be preconfigured in a protocol and are known by parties in communication.

For example, for a normal cyclic prefix (NCP), when X is greater than or equal to 3×Y, N is equal to 4; when X is less than 3×Y and greater than Y, N is equal to 8; when X is equal to Y, N is equal to 12.

Figure 6:
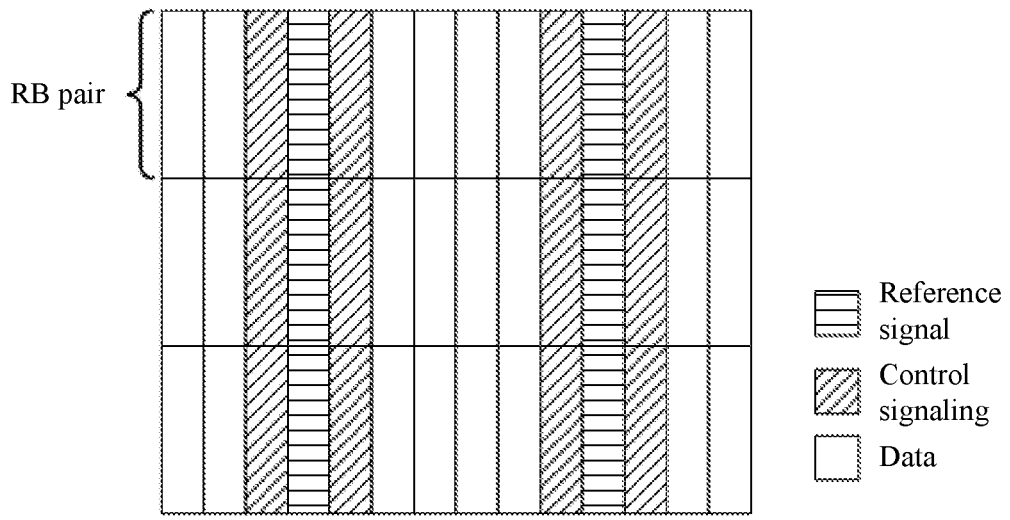
FIG. 6 is a schematic diagram of resource locations of control signaling and data according to an embodiment of the present invention.
Figure 7:
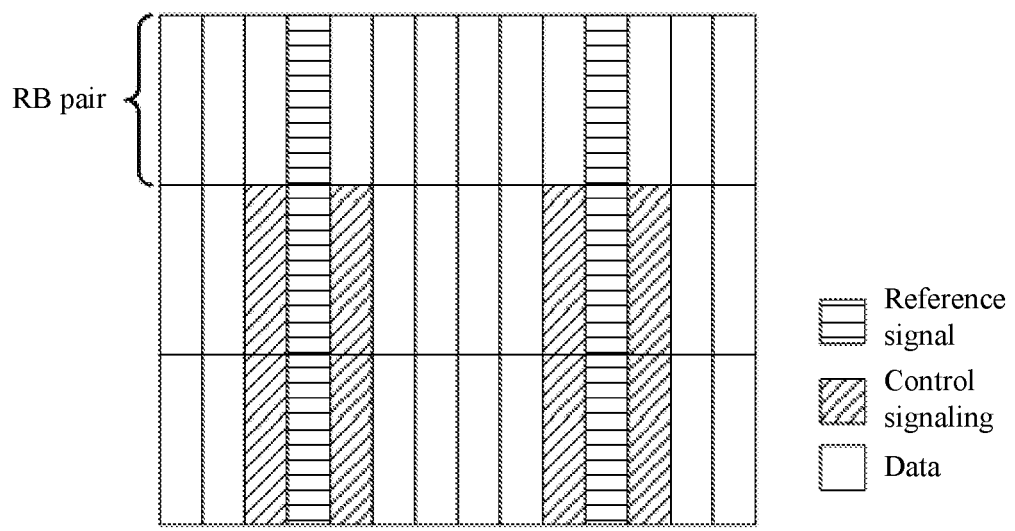
FIG. 7 is a schematic diagram of resource locations of control signaling and data according to an embodiment of the present invention.
Figure 8:
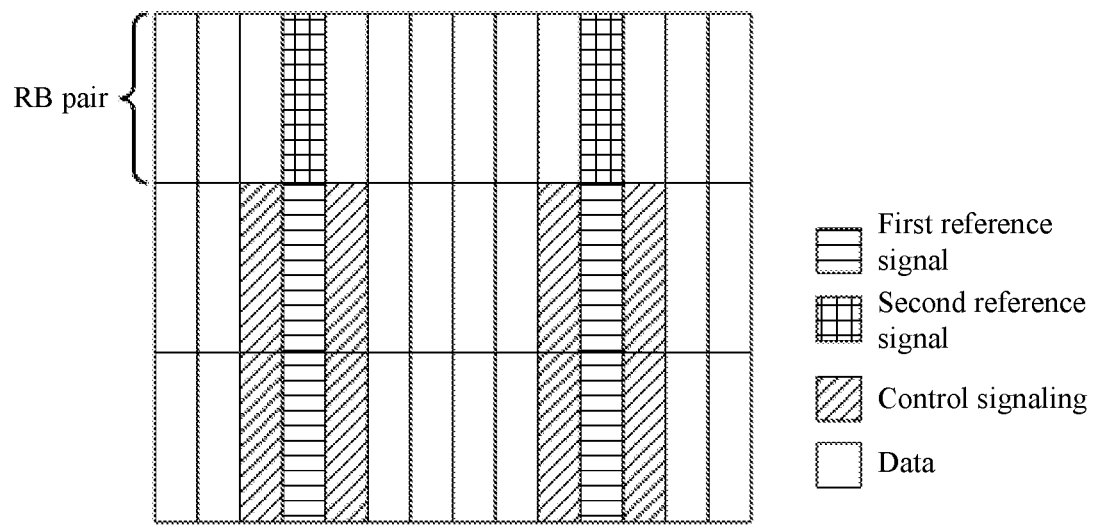
FIG. 8 is another schematic diagram of resource locations of control signaling and data according to an embodiment of the present invention.

For example, assuming that resources, in a predefined RB pair, used to transmit the control signaling are four symbols, that is, N=4, it may be obtained through calculation that Y=3 RB pairs need to be used to transmit the control signaling in frequency domain. If remaining REs in the three RB pairs are sufficient to transmit the data, X is equal to 3, and a relationship between locations of control signaling and a reference signal is shown in FIG. 6; otherwise, X is greater than 3 (an RB jointly occupied by control signaling and data and an RB exclusively occupied by data may share one reference signal or may share two reference signals; if two reference signals are shared, an independent sequence may be used for the two reference signals). If the RB jointly occupied by the control signaling and the data and the RB exclusively occupied by the data share one reference signal, the relationship between the locations of the control signaling and the reference signal is shown in FIG. 7. If the RB jointly occupied by the control signaling and the data and the RB exclusively occupied by the data share two reference signals, the relationship between the locations of the control signaling and the reference signal is shown in FIG. 8.

Figure 9:
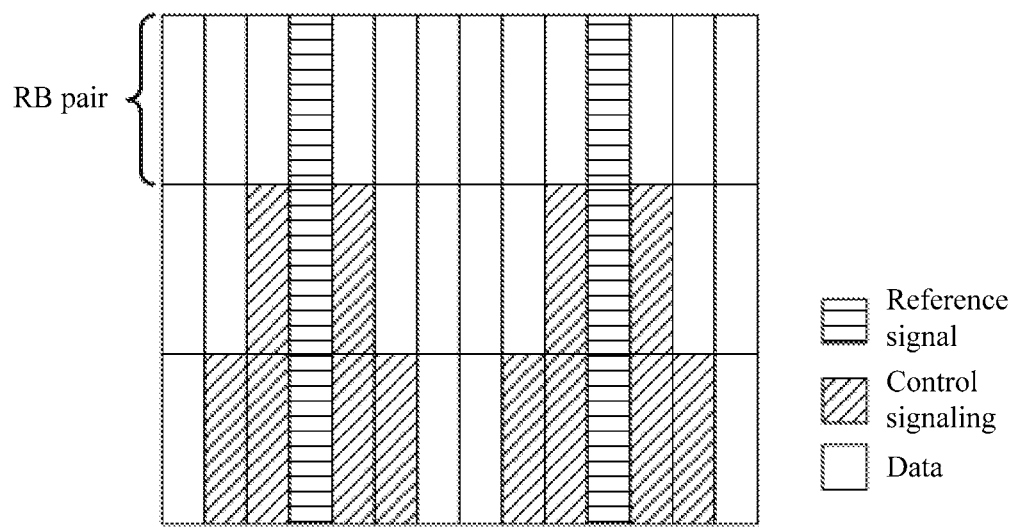
FIG. 9 is still another schematic diagram of resource locations of control signaling and data according to an embodiment of the present invention.

For example, assuming that resources, in a predefined RB pair, used to transmit control signaling are eight symbols, that is, N=8, it may be obtained through calculation that Y=2 RB pairs need to be used to transmit the control signaling in frequency domain. If remaining REs in the two RB pairs are sufficient to transmit data, X is equal to 2; otherwise, X is greater than 2, and the relationship between the locations of the control signaling and the reference signal is shown in FIG. 9.

Further, when a size of resources, in a predefined RB pair, used to transmit control signaling is greater than one symbol, in the RB pair occupied by the data, a transmission location of the control signaling extends outwards from symbols adjacent to the symbol occupied by the reference signal until a size of the resources occupied by the control signaling is equal to the size of the resources, in the predefined RB pair, used to transmit the control signaling.

Optionally, when N is greater than 1, the transmission location of the control signaling extends outwards from the symbols adjacent to the symbol occupied by the reference signal. Symbol locations of fields in the control signaling may be arranged arbitrarily.

Further, the end-to-end communications device is a transmit-end device; and if N is greater than 1, the control signaling is divided into a first part to an $N^{th}$ part in descending order of field priorities; and at the transmission location, the first part to the $N^{th}$ part are transmitted in ascending order of distances between the parts and the symbol occupied by the reference signal.

Figure 10:
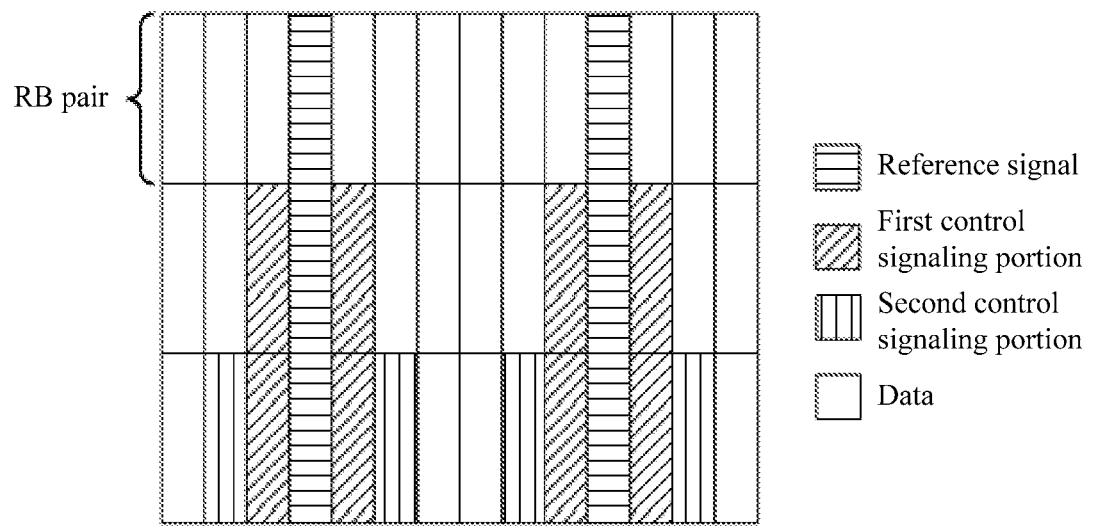
FIG. 10 is yet another schematic diagram of resource locations of control signaling and data according to an embodiment of the present invention.

For example, assuming that resources, in a predefined RB pair, used to transmit control signaling are eight symbols, that is, N=8, it may be obtained through calculation that Y=2 RB pairs need to be used to transmit the control signaling in frequency domain. When sending the control signaling, the transmit-end device divides the control signaling into a first control signaling portion and a second control signaling portion, where a priority of a field included in the first control signaling portion is higher than that of a field included in the second control signaling portion. The portion of a higher priority is placed on four symbols adjacent to the symbol occupied by the reference signal, and the portion of a lower priority is placed on the other four symbols. A specific relationship between the locations of the control signaling and the reference signal is shown in FIG. 10.

It should be noted that, the examples in the second case are merely used to describe the relationship between the locations of the control signaling and the reference signal, but are not intended to specifically limit content of the control signaling and the reference signal, and the relationship between the locations thereof.

Second Solution:

determining the resource subset based on a preset parameter, where the preset parameter is at least one of the following parameters: a control signaling-related parameter, a data-related parameter, a transmit-end-related parameter, a receive-end-related parameter, and a resource-related parameter.

It should be noted that, the preset parameter may be obtained through interaction with a base station in a handshake procedure, or the preset parameter may be preset. A manner of obtaining a preset parameter is not specifically limited in the present invention.

The following describes content of some preset parameters by using examples, but is not intended to specifically limit the content of the preset parameters.

For example, the control signaling-related parameter may be one or more of the following parameters: a control signaling period or a control signaling offset.

Assuming that a value of the control signaling period is T, a value of the control signaling offset ranges from 0 to T−1.

For example, the data-related parameter may be one or more of the following parameters: a priority of to-be-sent/received data or of a service of data, a type of to-be-sent/received data or of a service of data, or an ID of to-be-sent/received data or an ID of a service of data.

The priority of the data or of the service of the data is preset and is known by the transmit-end device and the receive-end device.

For example, the type of the to-be-sent/received data or of the service of the data may include but is not limited to one or more of the following items a to e.

a. Whether the service is a security related service, where a service type includes a security related service and a non-security related service.

b. Whether the data is periodical or aperiodic/event-triggered.

c. Whether the data is transmitted initially or retransmitted.

d. Whether content of the data is a cooperative awareness message (CAM) or a decentralized environmental notification message (DENM).

e. A specific message, such as control failure, emergency braking, congestion in front, or the like.

For example, the transmit-end-related parameter may be one or more of the following parameters: a sending terminal type or a sending terminal ID.

For example, the terminal type may be at least one of the following: a D2D terminal, a relay user equipment (UE), a pedestrian or vehicle-type terminal, a roadside apparatus, or a base station/network.

For example, the receive-end-related parameter may be one or more of the following parameters: a receiving terminal type, a receiving terminal ID, or a receiving terminal group ID.

For example, the resource-related parameter may be one or more of the following parameters: a control signaling resource pool bandwidth, a data resource pool bandwidth, a total bandwidth of a control signaling resource pool and a data resource pool, a common resource pool (a shared resource pool for control signaling and data) bandwidth, a system bandwidth, a subframe number, a timeslot number, or the like.

Specifically, in the foregoing second solution, an implementation for determining the resource subset based on the preset parameter may include but is not limited to the following two manners.

First Manner:

if the preset parameter is one parameter, determining that the resource subset is a resource or a resource pattern number, in a first preset correspondence, corresponding to the preset parameter, where the first preset correspondence includes at least one preset parameter and a resource or a resource pattern number in a one-to-one correspondence with the at least one preset parameter; or if the preset parameter is a plurality of parameters, determining that the resource subset is an intersection set of resources or resource pattern numbers, in the first preset correspondence, corresponding to all parameters of the preset parameter.

For example, priorities of data may be categorized into eight priorities, and different priorities are corresponding to different resource scopes. A service of a highest priority may not be limited (all parts of a resource pool), a service of a high priority is limited to a relatively large scope, and a service of a low priority is limited to a relatively small scope. Different priorities are corresponding to different resources. The service of the highest priority may be corresponding to all system resources or available resources, the service of the high priority is corresponding to a relatively large quantity of resources, and the service of the low priority is corresponding to a relatively small quantity of resources. Resources of a service of a high priority may include resources of a service of a low priority.

For example, if the transmit-end device is a D2D terminal, a resource corresponding to a preset parameter of the D2D terminal is obtained in the first preset correspondence and is used as the resource subset. If the receive-end device is to receive data sent by the D2D terminal only, the receive-end device may perform blind control signaling detection on the resource, obtained in the first preset correspondence, corresponding to the preset parameter of the D2D terminal, without performing other meaningless blind detection.

For example, the first preset correspondence may be stored in the end-to-end communications device in a tabular form. As listed in Table 1, Table 1 describes a first preset correspondence.

TABLE 1

| Preset parameter | Resource or resource pattern number |
| --- | --- |
| Preset parameter A | Resource X or resource pattern number 1 |
| Preset parameter B | Resource Y or resource pattern number 2 |
| Preset parameter C | Resource Z or resource pattern number 3 |
| Preset parameter D | Resource R or resource pattern number 4 |
| Preset parameter E | Resource V or resource pattern number 5 |
| . . . | . . . |

It should be noted that, Table 1 is merely used as an example to describe a form and content of the first preset correspondence, but is not intended to specifically limit the form and the content of the first preset correspondence. In actual application, the form and the content of the first preset correspondence may be determined based on an actual requirement.

Second Manner:

if the preset parameter is one parameter, determining that the resource subset is a resource or a resource pattern number, in a second preset correspondence, corresponding to a preset condition that the preset parameter satisfies, where the second preset correspondence includes at least one preset condition and a resource or a resource pattern number in a one-to-one correspondence with the at least one preset condition; or if the preset parameter is a plurality of parameters, determining that the resource subset is an intersection set of resources or resource pattern numbers, in the second preset correspondence, corresponding to a preset condition that each of the plurality of parameters satisfies.

For example, different resources or resource pattern numbers may be respectively configured for an even-numbered subframe and odd-numbered subframe in the second preset correspondence.

For example, the second preset correspondence may be stored in the end-to-end communications device in a tabular form. As listed in Table 2, Table 2 describes a second preset correspondence.

TABLE 2

| Preset parameter | Resource or resource pattern number |
| --- | --- |
| Preset parameter M, greater than P | Resource W or resource pattern number 10 |
| Preset parameter F, greater than 0 | Resource K or resource pattern number 12 |
| . . . | . . . |

It should be noted that, Table 2 is merely used as an example to describe a form and content of the second preset correspondence, but is not intended to specifically limit the form and the content of the second preset correspondence. In actual application, the form and the content of the second preset correspondence may be determined based on an actual requirement.

Further, in the second solution and the first case of the first solution, if the control signaling and the data are in a same subframe, the control signaling includes L, or the control signaling includes S0 and L, so that the receive-end device determines a transmission location of the data based on content included in the control signaling, and receives the data.

S0 is an interval between a resource end location of the control signaling and a resource start location of the data, and L is a length of the data.

S502. The transmit-end device determines a transmission location of the control signaling in the resource subset and sends the control signaling at the transmission location.

Optionally, the transmit-end device is a base station, that is, a centralized scheduling resource allocation mode is used, and S502 may specifically include:

centrally scheduling the transmission location in the resource subset; and sending the transmission location to the transmit-end device, to instruct the transmit-end device to transmit the SA at the transmission location.

Optionally, the transmit-end device is a sending terminal, that is, a contention-based resource allocation mode is used, and S502 may specifically include:

obtaining the transmission location in the resource subset through contention; and transmitting the SA at the transmission location.

S503. A receive-end device determines the resource subset used to transmit the control signaling, and performs blind control signaling detection in the resource subset.

It should be noted that, a process of determining, by the receive-end device, the resource subset used to transmit the control signaling is the same as a process of determining, by the transmit-end device, the resource subset used to transmit the control signaling. The process of determining the resource subset used to transmit the control signaling has been detailed in S501. Details are not described herein again.

Further, after S502, the method further includes: sending, by the transmit-end device, data.

Specifically, the sending, by the transmit-end device, data may include the following several implementations.

A first implementation is: The transmit-end device determines a resource corresponding to a data type of the to-be-sent data, and sends the data on the corresponding resource.

In the first implementation, the control signaling, an RNTI used for the control signaling, or a scrambling code used for the control signaling includes data type indication information.

A second implementation is: Send the data on a resource that is used to send the data and that is indicated by a base station, or send data on a data resource obtained by the transmit-end device through contention.

The control signaling includes data-related information that is used by the receive-end device to determine the transmission resource location of the data and receive the data.

A third implementation is: The control signaling and data share a resource in a time division multiplexing manner or in a frequency division multiplexing manner.

In the third implementation, the transmit-end device sends the data at continuous resource locations of the control signaling or at discontinuous resource locations. The control signaling includes a length L of the data, the control signaling includes S0, or the control signaling includes S0 and L, so that the receive-end device determines a transmission resource location of the data and receives the data.

A fourth implementation is: The control signaling and data share a resource in a time division multiplexing manner and are in a same subframe.

If Y is equal to X, the data is sent on a RE other than a RE occupied by the reference signal and by the control signaling in the RB pair occupied by the control signaling; or if Y is less than X, a part of the data is sent on a RE other than a RE occupied by the reference signal and by the control signaling in the RB pair occupied by the control signaling, and a remaining part of the data is sent by using a remaining RB pair.

Further, in the fourth implementation, the transmit-end device sends the data on the RE other than the RE occupied by the reference signal and by the control signaling in the RB pair occupied by the control signaling. The control signaling includes a length L of the data, or the control signaling includes L and direction indication information.

If the transmit-end device sends the part of the data on the RE other than the RE occupied by the reference signal and by the control signaling in the RB pair occupied by the control signaling, and sends the remaining part of the data by using the remaining RB pair, the control signaling includes a length L of the data and a reference signal identifier in the remaining RB pair, or the control signaling includes a length L of the data, direction indication information, and a reference signal identifier in the remaining RB pair.

Further, after S503, if the control signaling is correctly received, the method further includes: receiving, by the receive-end device, the data.

Specifically, processes of receiving the data by the receive-end device vary with different content included in the control signaling. The following several processes may be specifically included.

A first process is: If the control signaling, an RNTI used for the control signaling, or a scrambling code used for the control signaling includes data type indication information, the receive-end device receives the data on a resource corresponding to the data type indication information.

A second process is: The control signaling and the data are in a same subframe.

In the second process, if the control signaling includes S0 and L, the data is received within a resource interval between S1+S0 and S1+S0+L, where S1 is a resource end location of the control signaling. If the control signaling includes L, the data is received within a resource interval between S1+1 and S1+1+L. If the control signaling includes S0, the data is received within a resource interval between S1+S0 and S1+S0+L (L is a fixed length).

Optionally, the resource interval between S1+S0 and S1+S0+L or the resource interval between S1+1 and S1+1+L may be located in one resource pool.

Optionally, the resource interval between S1+S0 and S1+S0+L or the resource interval between S1+1 and S1+1+L may be located at two ends of a resource pool.

Optionally, the resource interval between S1+S0 and S1+S0+L or the resource interval between S1+1 and S1+1+L may be located in two resource pools.

A third process is: The control signaling and the data share a resource in a time division multiplexing manner and are in a same subframe, where the control signaling includes a length L of the data.

A process of receiving the data by the receive-end device specifically includes:

if a transmission resource of the data is preset to be at a frequency higher than that of a transmission resource of the control signaling, receiving, at a resource start location or end location of the control signaling, the data whose length is L by using the higher frequency; or if a transmission resource of the data is preset to be at a frequency lower than that of a transmission resource of the control signaling, receiving, at a resource start location or end location of the control signaling, the data whose length is L by using the lower frequency.

A fourth process is: The control signaling and the data share a resource in a time division multiplexing manner and are in a same subframe, where the control signaling includes a length L of the data and direction indication information.

A process of receiving the data by the receive-end device specifically includes:

if the direction indication information indicates a high-frequency direction, receiving, at a resource start location or end location of the control signaling, the data whose length is L by using a high frequency; or if the direction indication information indicates a low-frequency direction, receiving, at a resource start location or end location of the control signaling, the data whose length is L by using a low frequency.

A fifth process: The control signaling includes a reference signal identifier in remaining RB pair.

In the fifth process, the receiving the data by the receive-end device may include: receiving the part of the data on the RE other than the RE occupied by the reference signal and by the control signaling in the RB pair occupied by the control signaling; and receiving the remaining part of the data on a RE other than a RE occupied by the reference signal in an RB pair indicated by the reference signal identifier in the remaining RB pair.

Specifically, the process of receiving the part of the data on the RE other than the RE occupied by the reference signal and by the control signaling in the RB pair occupied by the control signaling is the same as the third process or the fourth process. Details are not described herein again.

According to the control signaling transmission method provided in this embodiment of the present invention, the resource subset used to transmit the control signaling is determined, where the resource subset is a part of the resource pool used to transmit the control signaling; and the transmission location of the control signaling is determined in the resource subset and the control signaling is sent at the transmission location, or blind control signaling detection is performed in the resource subset. In this way, after determining the resource subset based on a common principle, the transmit-end device and the receive-end device limit the transmission location of the control signaling to be within the resource subset. The transmit end sends the control signaling only in the resource subset, and the receive-end device performs blind control signaling detection only in the resource subset. The transmit-end device and the receive-end device cooperate with each other, so that the control signaling is transmitted (sent, or received through blind detection) within the resource subset. Compared with the prior art in which blind control signaling detection is performed in an entire resource pool, this embodiment greatly reduces demodulation/decoding workloads and a quantity of detection/blind decoding times that are of the receive-end device, and reduces power consumption and implementation complexity that are of the receive-end device.

Figure 11:
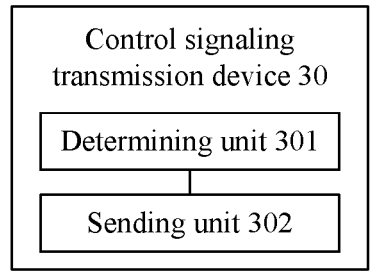
FIG. 11 is a schematic structural diagram of still another control signaling transmission device according to an embodiment of the present invention.
Figure 12:
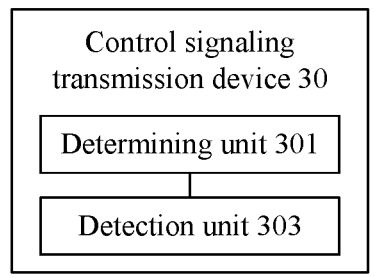
FIG. 12 is a schematic structural diagram of yet another control signaling transmission device according to an embodiment of the present invention.

According to another aspect, an embodiment of the present invention provides another control signaling transmission device 30. As shown in FIG. 11 and FIG. 12, the device 30 may include:

a determining unit 1101, configured to determine a resource subset used to transmit control signaling, where the resource subset belongs to a resource pool used to transmit the control signaling; and a sending unit 1102, configured to determine a transmission location of the control signaling in the resource subset determined by the determining unit 1101 and send the control signaling at the transmission location; or a detection unit 1103, configured to perform blind control signaling detection in the resource subset determined by the determining unit 1101.

Optionally, the determining unit 1101 may be specifically configured to:

determine the resource subset based on a preset rule.

Optionally, the preset rule may include that the resource subset is a specified resource set.

Optionally, the determining unit 1101 may be specifically configured to:

determining the resource subset based on a preset parameter, where the preset parameter is at least one of the following parameters: a control signaling-related parameter, a data-related parameter, a transmit-end-related parameter, a receive-end-related parameter, and a resource-related parameter.

Specifically, the determining unit 1101 may be specifically configured to:

if the preset parameter is one parameter, determine that the resource subset is a resource or a resource pattern number, in a first preset correspondence, corresponding to the preset parameter, where the first preset correspondence includes at least one preset parameter and a resource or a resource pattern number in a one-to-one correspondence with the at least one preset parameter; or if the preset parameter is a plurality of parameters, determine that the resource subset is an intersection set of resources or resource pattern numbers, in the first preset correspondence, corresponding to all parameters of the preset parameter.

Specifically, the determining unit 1101 may be specifically configured to:

if the preset parameter is one parameter, determine that the resource subset is a resource or a resource pattern number, in a second preset correspondence, corresponding to a preset condition that the preset parameter satisfies, where the second preset correspondence includes at least one preset condition and a resource or a resource pattern number in a one-to-one correspondence with the at least one preset condition; or if the preset parameter is a plurality of parameters, determine that the resource subset is an intersection set of resources or resource pattern numbers, in the second preset correspondence, corresponding to a preset condition that each of the plurality of parameters satisfies.

Figure 13:
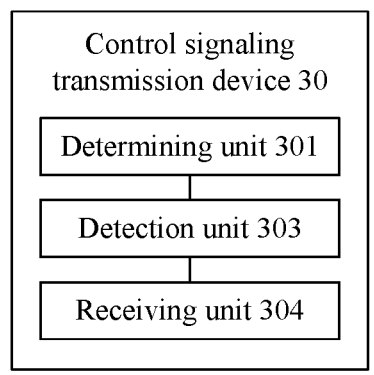
FIG. 13 is a schematic structural diagram of still yet another control signaling transmission device according to an embodiment of the present invention.

Further, as shown in FIG. 13, the device is a receive-end device, and the control signaling, an RNTI used for the control signaling, or a scrambling code used for the control signaling includes data type indication information; and the device 30 further includes:

a receiving unit 304, configured to receive data on a resource corresponding to the data type indication information.

Further, the control signaling and data are in a same subframe; and the control signaling includes L, or the control signaling includes S0 and/or L, where S0 is an interval between a resource end location of the control signaling and a resource start location of the data, and L is a length of the data.

Further, the receiving unit 304 may be further configured to:

if the control signaling includes S0 and L, receive the data within a resource interval between S1+S0 and S1+S0+L, where S1 is the resource end location of the control signaling;

if the control signaling includes L, receive the data within a resource interval between S1+1 and S1+1+L; or if the control signaling includes S0, receive the data within a resource interval between S1+S0 and S1+S0+L, where L is a fixed value.

Optionally, the resource interval between S1+S0 and S1+S0+L or the resource interval between S1+1 and S1+1+L is located in one resource pool;

the resource interval between S1+S0 and S1+S0+L or the resource interval between S1+1 and S1+1+L is located at two ends of a resource pool; or the resource interval between S1+S0 and S1+S0+L or the resource interval between S1+1 and S1+1+L is located in two resource pools.

Optionally, the control signaling and the data share a resource in a time division multiplexing manner, and the preset rule includes: the resource subset is N symbols, in an RB pair used to transmit the data, adjacent to a symbol occupied by a reference signal, where N is greater than or equal to 1.

Further, the device is a transmit-end device; and the sending unit 1102 may be specifically configured to:

if N is greater than 1, divide the control signaling into a first part to an $N^{th}$ part in descending order of field priorities; and transmit, at the transmission location, the first part to the $N^{th}$ part in ascending order of distances between the parts and the symbol occupied by the reference signal.

The data needs to occupy X RB pairs in frequency domain, the control signaling needs to occupy Y RB pairs in frequency domain, and Y is less than or equal to X.

Optionally, the device is a transmit-end device, and the control signaling and the data are in a same subframe; and the sending unit 1102 may be specifically further configured to:

if Y is equal to X, send the data on a RE other than a RE occupied by the reference signal and by the control signaling in the RB pair occupied by the control signaling; or if Y is less than X, send a part of the data on a RE other than a RE occupied by the reference signal and by the control signaling in the RB pair occupied by the control signaling, and send a remaining part of the data by using a remaining RB pair.

The device is a receive-end device, and the control signaling includes a length L of the data; and the device further includes a receiving unit, configured to:

if a transmission resource of the data is preset to be at a frequency higher than that of a transmission resource of the control signaling, receive, at a resource start location or end location of the control signaling, the data whose length is L by using the higher frequency; or if a transmission resource of the data is preset to be at a frequency lower than that of a transmission resource of the control signaling, receive, at a resource start location or end location of the control signaling, the data whose length is L by using the lower frequency.

Further, the control signaling includes a length L of the data and direction indication information; and the receiving unit 304 may be further configured to:

if the direction indication information indicates a high-frequency direction, receive, at a resource start location or end location of the control signaling, the data whose length is L by using a high frequency; or if the direction indication information indicates a low-frequency direction, receive, at a resource start location or end location of the control signaling, the data whose length is L by using a low frequency.

Optionally, the control signaling includes a reference signal identifier in the remaining RB pair.

Further, the device is a receive-end device, and the control signaling includes a reference signal identifier in the remaining RB pair; and the sending unit 1102 may be specifically configured to:

receive the part of the data on the RE other than the RE occupied by the reference signal and by the control signaling in the RB pair occupied by the control signaling; and receive the remaining part of the data on a RE other than a RE occupied by the reference signal in an RB pair indicated by the reference signal identifier in the remaining RB pair.

Optionally, the control signaling is a SA or a broadcast message.

The control signaling transmission device 30 provided in this embodiment of the present invention determines the resource subset used to transmit the control signaling, where the resource subset is a part of the resource pool used to transmit the control signaling; and determines the transmission location of the control signaling in the resource subset and sends the control signaling at the transmission location, or performs blind control signaling detection in the resource subset. In this way, after determining the resource subset based on a common principle, the transmit-end device and the receive-end device limit the transmission location of the control signaling to be within the resource subset. The transmit end sends the control signaling only in the resource subset, and the receive-end device performs blind control signaling detection only in the resource subset. The transmit-end device and the receive-end device cooperate with each other, so that the control signaling is transmitted (sent, or received through blind detection) within the resource subset. Compared with the prior art in which blind control signaling detection is performed in an entire resource pool, this embodiment greatly reduces demodulation/decoding workloads and a quantity of detection/blind decoding times that are of the receive-end device, and reduces power consumption and implementation complexity that are of the receive-end device.

It may be clearly understood by persons skilled in the art that, for the purpose of convenient and brief description, for a detailed working process of the foregoing system, apparatus, and unit, reference may be made to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or at least two units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, a network device, or the like) to perform some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

Finally, it should be noted that the foregoing embodiments are merely intended to describe the technical solutions of the present invention but not to limit the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method, applied to a transmit-end device in end-to-end communications, comprises:

determining a transmission resource of a control signaling in a resource subset for transmitting control signaling, wherein the resource subset belongs to a resource pool used to transmit the control signaling and data, the control signaling and the data are frequency division multiplexed in a same subframe and are continuous in frequency domain, and a transmission resource of the data is preset to be at a frequency higher than that of the transmission resource of the control signaling in the same subframe; and sending the control signaling at the transmission resource of the control signaling, and the control signaling indicates a frequency length of the data;

sending the data at the transmission resource of the data.

2. A method, applied to a receive-end device in end-to-end communications, comprises:
- determining a resource subset used to transmit control signaling based on a preset rule, wherein the resource subset belongs to a resource pool used to transmit the control signaling and data, and the preset rule comprises that the resource subset is a specified resource set; and
- performing blind control signaling detection in the resource subset, the control signaling indicates a frequency length of the data;
- after the control signaling is correctly received at a transmission resource of the control signaling in the resource subset, receiving the data at a transmission resource of the data;
- wherein, the control signaling and the data are frequency division multiplexed in a same subframe and are continuous in frequency domain, and the transmission resource of the data is preset to be at a frequency higher than that of the transmission resource of the control signaling in the same subframe.

3. The method according to claim 2, wherein data type indication information is indicated by at least one of the control signaling, a radio network temporary identifier (RNTI) used for the control signaling, or a scrambling code used for the control signaling, and the method further comprises:
- receiving data on a resource corresponding to the data type indication information.

4. The method according to claim 1, wherein the control signaling comprises S0, wherein S0 is an interval between a resource end location of the control signaling and a resource start location of the data in frequency domain.

5. The method according to claim 2, wherein receiving the data comprises:
- receiving the data within a resource interval between S1+1 and S1+1+L, wherein S1 is a resource end location of the control signaling.

6. The method according to claim 1, wherein the control signaling is a scheduling assignment (SA) or a broadcast message.

7. A control signaling transmission device, wherein the device comprises:
- a non-transitory memory storage comprising instructions; and
- one or more hardware processors in communication with the memory storage, wherein the one or more hardware processors execute the instructions to:
  - determine a transmission resource of a control signaling in a resource subset for transmitting control signaling, wherein the resource subset belongs to a resource pool used to transmit the control signaling and data, the control signaling and the data are frequency division multiplexed in a same subframe and are continuous in frequency domain, and a transmission resource of the data is preset to be at a frequency higher than that of the transmission resource of the control signaling in the same subframe; and
  - send the control signaling at the transmission resource of the control signaling, and the control signaling indicates a frequency length of the data;
  - send the data at the transmission resource of the data.

8. A control signaling transmission device, wherein the device comprises:
- a non-transitory memory storage comprising instructions; and
- one or more hardware processors in communication with the memory storage, wherein the one or more hardware processors execute the instructions to:
  - determine a resource subset used to transmit control signaling based on a preset rule, wherein the resource subset belongs to a resource pool used to transmit the control signaling and data, and the preset rule comprises that the resource subset is a specified resource set; and
  - perform blind control signaling detection in the resource subset, the control signaling indicates a frequency length of the data;
  - after the control signaling is correctly received at a transmission resource of the control signaling in the resource subset, receive the data at a transmission resource of the data;
  - wherein, the control signaling and the data are frequency division multiplexed in a same subframe and are continuous in frequency domain, and the transmission resource of the data is preset to be at a frequency higher than that of the transmission resource of the control signaling in the same subframe.

9. The device according to claim 8, wherein data type indication information is indicated by at least one of the control signaling, a radio network temporary identifier (RNTI) used for the control signaling, or a scrambling code used for the control signaling; and the device further comprises:
- a receiver configured to receive data on a resource corresponding to the data type indication information.

10. The device according to claim 7, wherein the control signaling comprises S0, wherein S0 is an interval between a resource end location of the control signaling and a resource start location of the data in frequency domain.

11. The device according to claim 8, wherein the one or more hardware processors further execute the instructions to:
- receive the data within a resource interval between S1+1 and S1+1+L, wherein S1 is a resource end location of the control signaling.

12. The device according to claim 7, wherein the control signaling is a scheduling assignment (SA) or a broadcast message.

13. The method according to claim 2, wherein the control signaling is a scheduling assignment (SA) or a broadcast message.

14. The device according to claim 8, wherein the control signaling is a scheduling assignment (SA) or a broadcast message.

* * * * *

UNITED STATES PATENT AND TRADEMARK OFFICE
CERTIFICATE OF CORRECTION

| | |
|---|---|
| PATENT NO. | : 11,696,325 B2 |
| APPLICATION NO. | : 16/054120 |
| DATED | : July 4, 2023 |
| INVENTOR(S) | : Xingwei Zhang and Chao Li |

It is certified that error appears in the above-identified patent and that said Letters Patent is hereby corrected as shown below:

In the Specification

In Column 1, In Line 9 (approx.), Delete "PCT/CN 2016/073706" and insert -- PCT/CN2016/073706, --.

Signed and Sealed this
Seventeenth Day of October, 2023

Katherine Kelly Vidal
*Director of the United States Patent and Trademark Office*